United States Patent [19]
Schulcz

[11] Patent Number: 5,235,318
[45] Date of Patent: Aug. 10, 1993

[54] INDIVIDUAL ELECTRONIC DOSIMETRY INSTALLATION

[75] Inventor: Francis Schulcz, Aureille, France
[73] Assignee: Merlin Gerin, Meylan, France
[21] Appl. No.: 791,397
[22] Filed: Nov. 14, 1991
[30] Foreign Application Priority Data
  Nov. 21, 1990 [FR] France .................. 90 14602
[51] Int. Cl.⁵ .................................. G08B 26/00
[52] U.S. Cl. ............................. 340/505; 340/539; 340/572; 340/573; 340/825.31; 250/336.1
[58] Field of Search ........... 340/505, 573, 539, 825.31, 340/825.32, 531, 572; 250/388, 336.1

[56] References Cited

U.S. PATENT DOCUMENTS

| | | | |
|---|---|---|---|
| 4,284,892 | 8/1981 | Hulot et al. ........................ | 250/388 |
| 4,489,315 | 12/1984 | Falk et al. ........................ | 340/600 |
| 4,598,275 | 7/1986 | Ross et al. ........................ | 340/573 |
| 4,614,945 | 9/1986 | Brunius et al. ........................ | 340/505 |
| 4,822,990 | 4/1989 | Tamada et al. . | |

FOREIGN PATENT DOCUMENTS

| | | |
|---|---|---|
| 03000054 | 1/1989 | European Pat. Off. . |
| 2244176 | 9/1972 | Fed. Rep. of Germany ...... 340/505 |

*Primary Examiner*—Jin F. Ng
*Assistant Examiner*—Edward Lefkowitz
*Attorney, Agent, or Firm*—Parkhurst, Wendel & Rossi

[57] ABSTRACT

The installation is designed for automatic surveillance of the radiation dose absorbed by an individual carrying a dosimeter during his stay in a specific zone. Each access point to this zone comprises a reader able to transmit a radioelectric wave carrying a proximity signal and possibly other data to the dosimeter. This signal is received by the dosimeter, and the latter retransmits a wave carrying measuring and identification data, and so on, to the reader.

9 Claims, 2 Drawing Sheets

INDIVIDUAL ELECTRONIC DOSIMETRY INSTALLATION

BACKGROUND OF THE INVENTION

The present invention relates to an individual electronic dosimetry installation designed for measuring and surveillance of the radiation dose absorbed by an individual during a stay in a specific room.

It is state-of-the-art to achieve semi-automatic individual electronic dosimetry installations each comprising a certain number of dosimeters, each designed to be carried by a user during his stay in the room subjected to possible radiations, readers located at the entrances and exits of the monitored zone, and a computer-based centralizer generally located outside this zone.

At the entrance to this monitored zone, each portable dosimeter is initialized either by the storage rack in which it is placed at a specific place, or more generally by a reader close to the entrance door: in this case, the dosimeter is constantly carried by the user, who has to insert it in this reader when he passes.

The dosimeter thus activated then measures the accumulated radiation dose to which the user has been exposed throughout his stay in the monitored zone.

When leaving this zone, the user presents his dosimeter to an exit reader, or puts it back in its specific place in the storage rack, which results in the information it contains being transferred to the computer-based centralizer. To perform this reading operation, the user has to remove his dosimeter from its carrying position, generally at chest or waist level, and insert it in a recess in which coupling with a reading device is performed, either by a purely electrical contact or by an infrared or magnetic connection. He also has to identify himself, for example by means of a keyboard entry.

Having to identify oneself and to move the dosimeter has the drawback of making its use singularly complicated, in particular if this dosimeter is worn under protective overalls or if it has to be protected by a case due to risks of contamination or interference.

The reading recess may moreover be contaminated by a dosimeter when the latter is inserted, and it may then transmit this contamination to the other dosimeters subsequently inserted in this recess.

Finally, the fact that each user has to make a stop when entering and leaving the monitored zone reduces the flow of movement and thereby also constitutes an inconvenience to operation.

SUMMARY OF THE INVENTION

The object of the invention is to overcome all these drawbacks by doing away with any handling operations of the individual portable dosimeters when entering or leaving the room or zone to be monitored, and by enabling the necessary dosimetric and identification operations to be performed without the carrier having to stop when passing or accessing the zone. It involves for this purpose an individual electronic dosimetry installation designed for measurement and surveillance of the radiation dose absorbed by an individual carrying an electronic dosimeter during his stay in a specific zone, this installation presenting the following particular features:

each individual portable dosimeter is made up of at least two sub-assemblies, a first sub-assembly of which constituting an electronic dosimeter proper and an identification device, and a second sub-assembly constituting a transmission device by carrier waves able to perform data exchanges or transmissions between this first sub-assembly and an electronic reading device placed at each access point to this zone;

each of these access points comprises an electronic reading device which is at least designed not only to collect and process the dosimetry and identification data which is transmitted to it by each dosimeter, but also to at least transmit to the dosimeter a proximity signal able to at least trigger transmission of this data.

BRIEF DESCRIPTION OF THE DRAWINGS

Anyway, the invention will be fully understood, and its advantages and features will become more clearly apparent from the following description of an illustrative embodiment of an automatic individual electronic dosimetry installation, given as a non-restrictive example only and represented in the accompanying schematic drawings, in which.

DESCRIPTION OF THE PREFERRED EMBODIMENT

Figure 1:
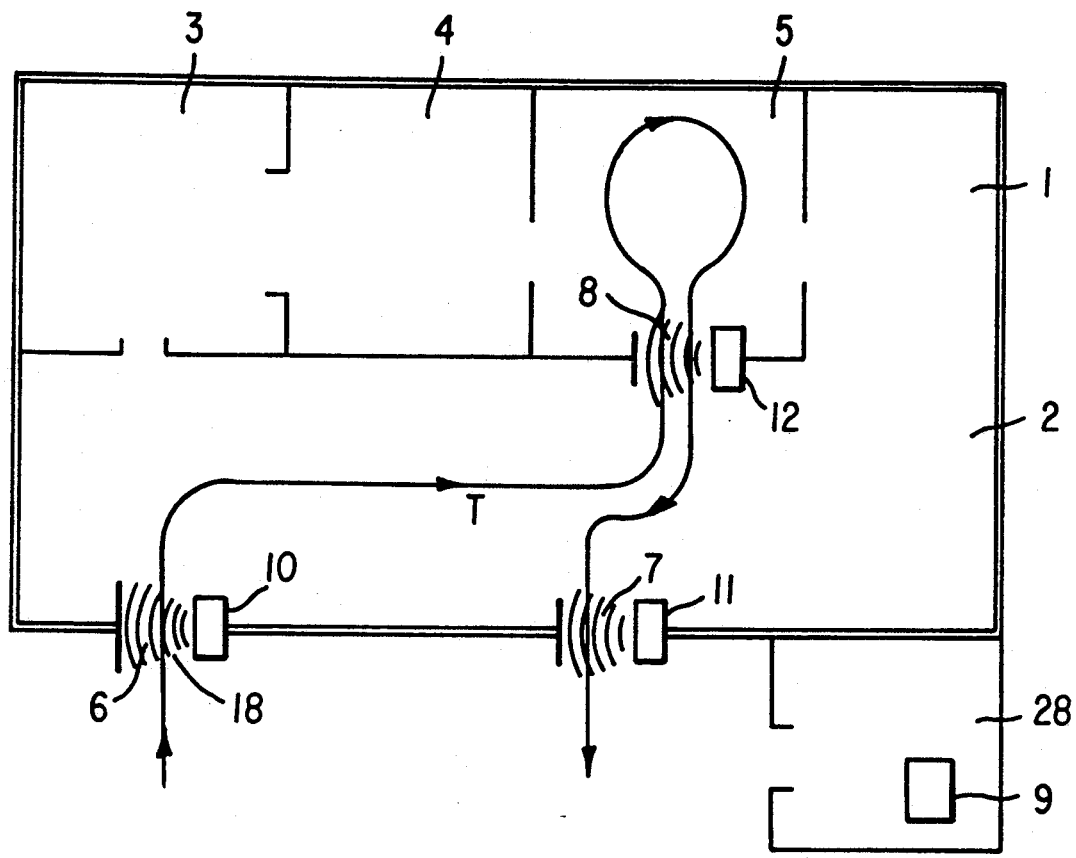
FIG. 1 is a general layout diagram of this dosimetric surveillance installation.

Referring to FIG. 1, the room or zone 1 to be monitored has been outlined with a double line for the sake of clarity. It comprises in this example a large main room 2 and three smaller rooms 3, 4, 5, with room 5 requiring particular monitoring.

Access to zone 1 is via two entrance/exit doors 6 and 7, and access to the particular room 5 is via a single entrance/exit door 8.

A central control and computing logic unit 9, or "centralizer" is placed in a room 28, located outside the monitored zone 1.

At each of the access points 6, 7 to zone 1 and at the access point 8 to the particular room 5, there is installed an electronic reading device, or reader, respectively 10, 11 and 12, which comprises a radioelectric data transceiver, thus able to correspond with each individual dosimeter, and which is in addition connected by a galvanic computer link to the centralizer device 9.

Figure 2:
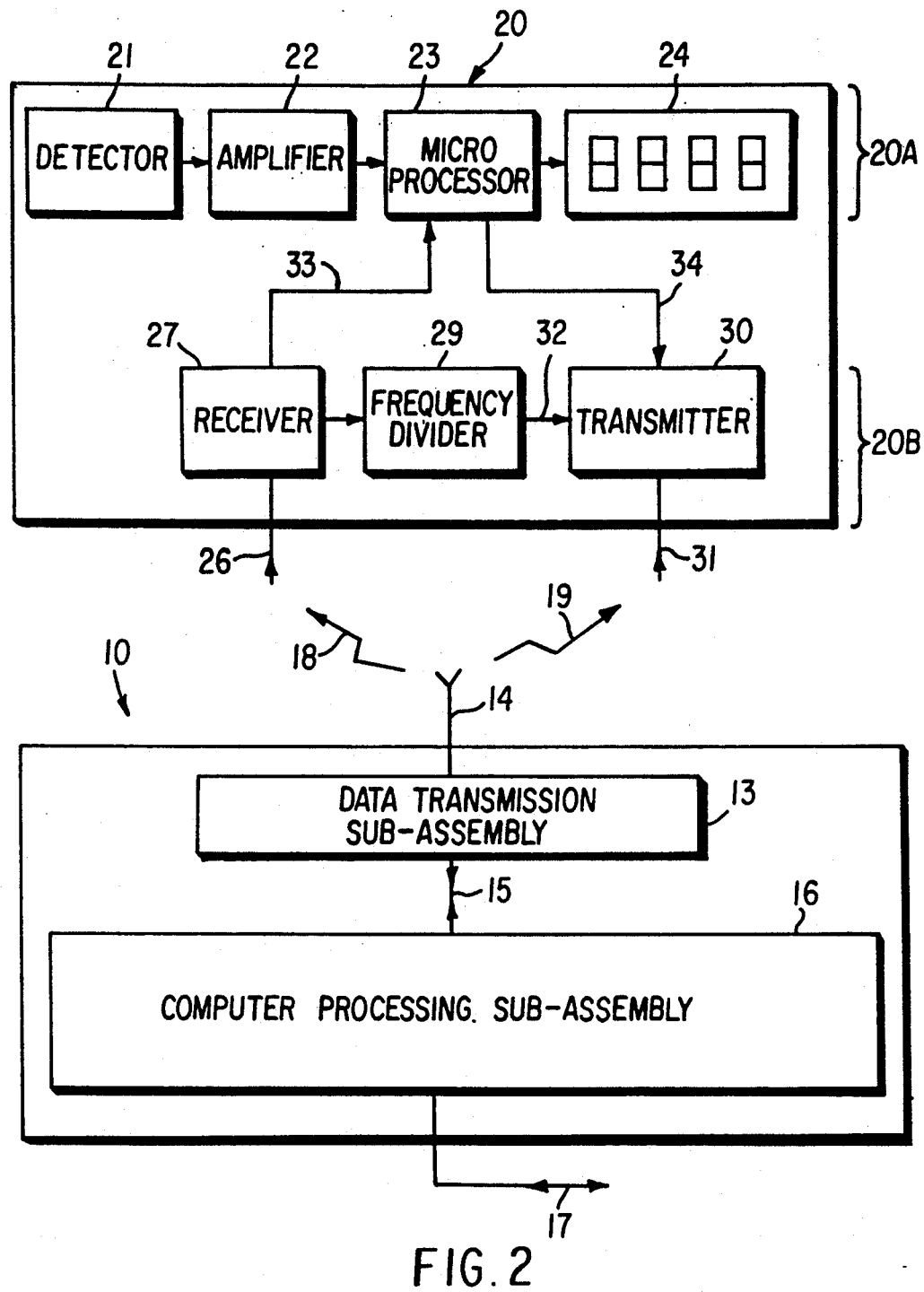
FIG. 2 is a block diagram of one of the dosimeters and an associated reader.

Referring now to FIG. 2, each reader (for example the reader 10) is made up of a data transmission sub-assembly 13 by radioelectric waves, equipped with a transmitter/receiver aerial 14 and connected by a two-way connection 15 to a computer processing sub-assembly 16, itself connected to the abovementioned centralizer device 9 by a computer connection 17.

The first function of the transmission sub-assembly 13 is to continuously create an electromagnetic field in an activation volume of the dosimeters, by transmission of a radioelectric wave 18, and its second function is to receive the data from the dosimeter 20 transmitted by another radioelectric wave 19, and if required to re-transmit data for loading into this dosimeter 20.

The processing sub-assembly 16 transforms the data exchanged with the dosimeter 20 into a computer connection standard. It advantageously provides in addition a local indication, enabling the user for instance to check that the exchanges have been performed correctly or inviting him to pass in front of the reader again if necessary. It also preferably performs local data storing in the event of the connection with the centralizer device 9 being accidentally broken.

The role of the centralizer device 9 consists in managing the dosimetric data received: concentration, storage, and use. It can also, as an accessory function, control the authorizations to access the zone 1 to be monitored thus performing surveillance of the personnel in the zone: the dosimetry installation then also acts as access control installation.

Each dosimeter, such as the dosimeter 20 whose block diagram is represented in FIG. 2, comprises:
- a first dosimetric measuring sub-assembly 20A comprising a radiation detector 21, a pulse amplifier/-discriminator 22, and a microprocessor 23 which counts these pulses and deduces therefrom the radiation dose received, this measurement being preferably transmitted to a display device 24.
- a second radioelectric transmission sub-assembly 20B which comprises a receiver aerial 26 of the radioelectric waves 18 coming from the reader 10, and a detection and possibly demodulation assembly 27 of the wave received 18, a carrier frequency divider 29, an assembly 30 for modulation of the signals transmitted by the microprocessor 23 and for transmission of these modulated signals, by an aerial 31, in the form of the above-mentioned radioelectric wave 19.

The device 29 is for example a divider by two, so that the wave which it applies to the input 32 of the modulator of the transmitter device 30, and which is the carrier transmitted by the aerial 31, is of a frequency half that of the wave 18 received by the aerial 26. Other solutions can also be used, such as modifying the modulation mode or the polarization mode between received and transmitted wave.

The detected or demodulated data obtained at the output 33 of the receiver 27 is transmitted to the microprocessor 23 for processing. This essentially involves the proximity signal of the reader 10, but it may also involve command and/or dialogue data: reinitialization command signal, dose read command signal, switch to "active" mode signal, switch to "pause" mode signal, alarm threshold adjustment command, etc.

The useful data contained in the microprocessor 23 is transmitted, via the link 34, to the modulator of the transmitter 30 to be transmitted by radioelectric waves to the reader 10, receipt of the waves 19 and transmission of the waves 18 by the latter being performed practically simultaneously. This useful data naturally relates to the radiation dose stored, but also relates to identification of the dosimeter and/or of the user carrying it, indication of the alarm threshold value, etc.

In FIG. 1, a possible example of the path T taken by a user has been represented by arrows. The user enters the zone 1 via the door 6, and is naturally carrying an individual dosimeter such as the dosimeter 20.

When he passes at the level of the reader 10, the dosimeter is automatically reinitialized, its alarm threshold is adjusted to the appropriate value for zone 1, and it is switched to "active" mode, all these operations being performed without the user having to do anything, or even noticing anything, the dosimeter being able to remain hidden under his clothing. The central device 9 is also informed of the identity of the person and of the time of entry (hours, minutes, seconds).

When he crosses zone 2, going towards the door 8, the dosimeter 20 accumulates the radiation dose received in its microprocessor 23 memory.

Passing in front of the reader 12 of door 8 triggers for example a room 5 access authorization check, followed by dose measurement, alarm threshold adjustment change, and a new reinitialization if required. These operations are likewise carried out, but in reverse, when leaving this room 5.

At the level of door 7, the reader 11 performs a new dose reading, and a new access check reading, and orders the dosimeter 20 to switch to "pause" mode.

The invention is naturally in no way limited to the embodiment particularly described above. Thus, for example, although transmission by radioelectric waves is preferred for the installation, other transmission waves could just as well be used: infra-red waves, ultra-sounds, etc. In a simplified embodiment, the receiver 27 could be scheduled only for detection of a wave 18 simply giving reader proximity information: on receipt of the proximity signal, the dosimeter 20 would simply send its measurement and identification data in the direction of this reader, without any other data exchange.

I claim:

1. An individual electronic dosimetry system designed for surveillance of the radiation does absorbed by an individual carrying an electronic dosimeter while located in a specified zone to be monitored, said system comprising:
   at least one individual portable dosimeter including a first sub-assembly for measuring the amount of radiation received by the portable dosimeter and generating corresponding measuring data and for generating identification data specific to the dosimeter, and a second sub-assembly for performing data transmissions and/or exchanges of the measuring and identification data between the first sub-assembly and at least one electronic reading device placed at an access point to the zone to be monitored;
wherein the electronic reading device includes means for processing the measuring and identification data which is transmitted to it by the dosimeter, and means for transmitting to the dosimeter a proximity signal that triggers the second sub-assembly to transmit the measuring and identification data to the electronic reading device by carrier wave.

2. The individual dosimeter system according to claim 1, wherein the second sub-assembly comprises a receiver for demodulating data transmitting by the electronic reading device to enable an almost instantaneous exchange of data and/or instruction between the electronic reading device and the first sub-assembly.

3. The individual dosimeter system according to claim 1, wherein an additional reading device is provided at each access point to a particular room within the zone to be monitored.

4. The individual dosimeter system according to claim 1, wherein the reading device is connected by a computer link to a central device located outside of the zone to be monitored.

5. The individual dosimeter system according to claim 1, wherein the carrier waves used by the electronic reading device are radioelectric waves.

6. An individual electronic dosimetry system for surveying a radiation dose absorbed by a person carrying a portable individual dosimeter while in a specific zone to be monitored, said system comprising:
   a portable dosimeter comprising a measuring and identification sub-assembly, including a radiation detector connected to a microprocessor, for counting pulses corresponding to a received radiation dose; a radioelectric transmission sub-assembly, including a receiver and a transmitter, for performing data transmissions between the measuring and identification sub-assembly and at least one electronic reading device located at an access point to the zone to be monitored; a first antenna coupled to the receiver of the radioelectric transmission sub-assembly; and a second antenna coupled to the transmitter of the radioelectric transmission sub-assembly;

wherein the electronic reading device includes a transmitter/receiver sub-assembly coupled to a third antenna that transmits information to the first antenna and receives information from the second antenna through the third antenna;

wherein the dosimeter includes a first electrical link, coupled to the receiver and the microprocessor, for sending a control signal transmitted by the electronic reading device and received by the receiver to the microprocessor; and a second electrical link, coupled to the microprocessor and the transmitter, for sending measuring and identification data contained in the microprocessor to the transmitter when the microprocessor receives the control signal.

7. An individual electronic dosimetry system as claimed in claim 6, wherein the receiver of the radioelectric transmission sub-assembly includes a demodulator.

8. An individual electronic dosimetry system as claimed in claim 6, wherein a frequency divider device is inserted between the receiver and the transmitter of the radioelectric transmission sub-assembly.

9. An individual electronic dosimetry system as claimed in claim 6, wherein said electronic reading device is connected by a bus to a central processing circuit located outside of the zone to be monitored.

* * * * *